(12) United States Patent
Tange (10) Patent No.: US 11,868,836 B2
(45) Date of Patent: Jan. 9, 2024

(54) IC CARD AND CONTROL PROGRAM FOR IC CARD

(71) Applicants: KABUSHIKI KAISHA TOSHIBA, Tokyo (JP); Toshiba Infrastructure Systems & Solutions Corporation, Kawasaki (JP)

(72) Inventor: Daisuke Tange, Kawasaki (JP)

(73) Assignees: KABUSHIKI KAISHA TOSHIBA, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 0 days.

(21) Appl. No.: 17/807,251

(22) Filed: Jun. 16, 2022

(65) Prior Publication Data
US 2022/0309312 A1    Sep. 29, 2022

Related U.S. Application Data

(63) Continuation of application No. PCT/JP2020/044425, filed on Nov. 30, 2020.

(30) Foreign Application Priority Data

Dec. 20, 2019  (JP) ................................ 2019-230798

(51) Int. Cl.
*G06K 19/077* (2006.01)
*G06K 19/07* (2006.01)
*G06K 19/073* (2006.01)

(52) U.S. Cl.
CPC ..... *G06K 19/07769* (2013.01); *G06K 19/073* (2013.01); *G06K 19/0723* (2013.01)

(58) Field of Classification Search
CPC ......... G06K 19/07769; G06K 19/0723; G06K 19/073
(Continued)

(56) References Cited

U.S. PATENT DOCUMENTS

| 9,449,912 B1* | 9/2016 | Zhang | .................... H01L 24/06 |
| 2006/0016868 A1* | 1/2006 | Bonalle | .................... G07C 9/27 |
| | | | 235/382 |

(Continued)

FOREIGN PATENT DOCUMENTS

| JP | 9-231331 A | 9/1997 |
| JP | 2002-304605 A | 10/2002 |

(Continued)

OTHER PUBLICATIONS

International Search Report dated Feb. 22, 2021 in PCT/JP2020/044425, filed on Nov. 30, 2020, 2 pages.
(Continued)

*Primary Examiner* — Allyson N Trail
(74) *Attorney, Agent, or Firm* — Maier & Maier, PLLC (57) ABSTRACT

An IC card according to an embodiment includes a contact communication interface, a non-contact communication interface, and a processor. A contact communication means is configured to perform contact communication with a reader/writer. A non-contact communication means is configured to perform non-contact communication with the reader/writer. The processor is configured to set an Answer To Reset (ATR) in the contact communication and an Answer To Select (ATS) in the non-contact communication based on a predetermined command including historical bytes.

4 Claims, 5 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2006/0095598 A1 | 5/2006 | Prevost et al. | |
| 2007/0012785 A1* | 1/2007 | Ohyama | G06K 19/07 235/492 |
| 2009/0236416 A1* | 9/2009 | Morita | G06K 19/07769 235/492 |
| 2010/0243738 A1 | 9/2010 | Shimizu et al. | |
| 2013/0290479 A1* | 10/2013 | Faher | H04L 67/06 709/217 |
| 2017/0116101 A1* | 4/2017 | Goyet | G06K 7/10722 |
| 2019/0362341 A1* | 11/2019 | Chen | H04L 63/12 |

FOREIGN PATENT DOCUMENTS

| | | |
|---|---|---|
| JP | 2003168092 A | 6/2003 |
| JP | 2003-288561 A | 10/2003 |
| JP | 4231148 B2 | 2/2009 |
| JP | 2011-243027 A | 12/2011 |
| JP | 2013-122690 A | 6/2013 |
| JP | 2013-168092 A | 8/2013 |

OTHER PUBLICATIONS

European Search Report dated Nov. 15, 2023, in corresponding European Application No. EP20901817, 7 pages.

* cited by examiner

IC CARD AND CONTROL PROGRAM FOR IC CARD

CROSS REFERENCE TO RELATED APPLICATIONS

This application is a Continuation Application of PCT Application No. PCT/JP2020/044425, filed Nov. 30, 2020 and based upon and claiming the benefit of priority from Japanese Patent Application No. 2019-230798, filed Dec. 20, 2019, the entire contents of all of which are incorporated herein by reference.

FIELD

Embodiments described herein relate generally to an IC card and a control program for the IC card.

BACKGROUND

An IC card (portable electronic device) including an IC chip having a processor, a nonvolatile memory, a random access memory (RAM), and a communication interface has been put into practical use. Further, a dual interface card, which is an IC card having a contact communication interface for performing contact communication and a non-contact communication interface for performing non-contact communication, has been generally put into practical use.

The IC card transmits, to a host device, information indicating characteristics of the card, such as a manufacturer, information about a chip, the number of rewritable times, and a presence or absence of support for a format using an extended length (referred to as an extended format). The information indicating the characteristics of the card is, for example, historical bytes defined by ISO/IEC 7816. When the IC card performs contact communication with a host device, the IC card transmits an Answer To Reset (ATR) including a historical byte to the host device. When the IC card performs non-contact communication with a host device, the IC card transmits an Answer To Select (ATS) including historical bytes to the host device.

There are various methods for rewriting the historical bytes included in the ATR, such as "setATRHistBytes" defined in "GPSystem" of "globalplatform". However, in the above method, there is a problem in that the historical bytes included in the ATS cannot be rewritten.

CITATION LIST

Patent Literature

Patent Literature 1: Jpn. Pat. Appln. KOKAI Publication No. 2003-288561

SUMMARY

An object of the present invention is to provide a highly convenient IC card and a control program for the IC card.

An IC card according to an embodiment includes a contact communication interface, a non-contact communication interface, and a processor. A contact communication means is configured to perform contact communication with a reader/writer. A non-contact communication means is configured to perform non-contact communication with the reader/writer. The processor is configured to set an Answer To Reset (ATR) in the contact communication and an Answer To Select (ATS) in the non-contact communication based on a predetermined command including historical bytes.

DETAILED DESCRIPTION

Hereinafter, the embodiments will be described with reference to the accompanying drawings.

Figure 1:
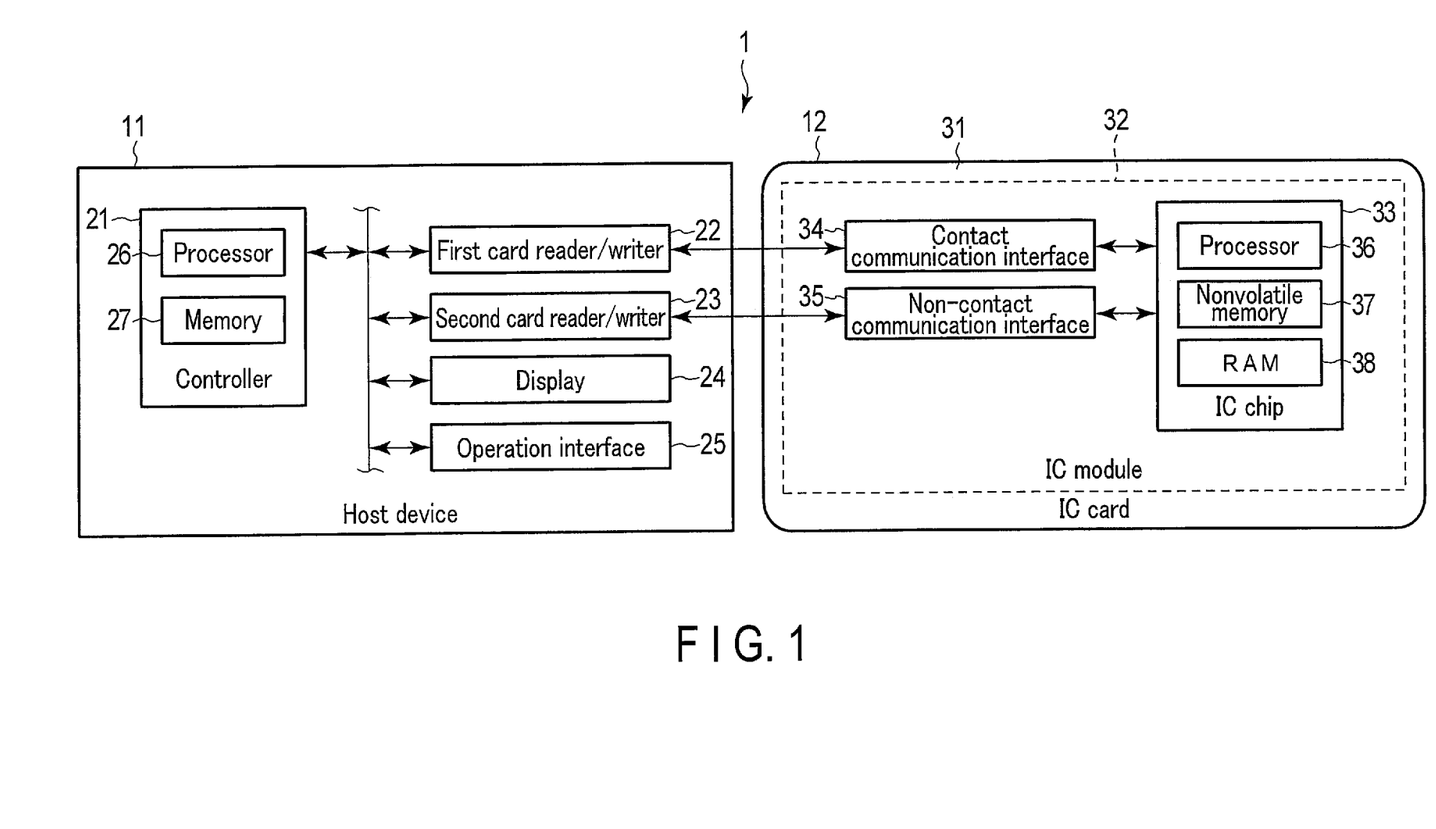
FIG. 1 is an explanatory diagram for explaining a configuration example of an IC card processing system according to an embodiment.

FIG. 1 is an explanatory diagram for explaining an example of an IC card processing system 1.

The IC card processing system 1 includes a host device 11, an IC card 12 (portable electronic device), and the like. The host device 11 and the IC card 12 are configured to be able to communicate with each other in a contact or non-contact manner. Note that the IC card processing system 1 may include a configuration as necessary in addition to the configuration illustrated in FIG. 1, or a specific configuration may be excluded from the IC card processing system 1.

First, the configuration of the host device 11 will be described.

The host device 11 is an IC card processing device that processes the IC card 12. The host device 11 controls the entire IC card processing system 1. The host device 11 activates the IC card 12 by supplying electric power to the IC card 12. In addition, the host device 11 causes the IC card 12 to execute various operations by transmitting various commands to the IC card 12.

The host device 11 includes a controller 21, a first card reader/writer 22, a second card reader/writer 23, a display 24, an operation interface 25, and the like.

The controller 21 controls various operations of the host device 11. The controller 21 includes a processor 26 and a memory 27.

The processor 26 includes an arithmetic element (for example, a CPU) that executes arithmetic processing. The processor 26 executes various operations by executing a program stored in the memory 27.

The memory 27 stores the program, data for use in the program, and the like. The memory 27 includes, for example, a driver of the first card reader/writer 22, a driver of the second card reader/writer 23, a program for generating an image to be displayed on the display 24, and a program for interpreting an operation input by the operation interface 25. Further, the memory 27 includes a program for performing transmission of a command and reception of a response with the IC card 12. That is, the memory 27 stores a control program for the IC card processing device that processes the IC card 12.

The first card reader/writer 22 is an interface for performing contact communication with the IC card 12. The first card reader/writer 22 includes a plurality of contact terminals physically and electrically connected to a contact pattern of the IC card 12, and a slot into which the IC card 12 is inserted. The first card reader/writer 22 transmits and receives data to and from the IC card 12 via the contact terminals and the contact pattern. The first card reader/writer 22 supplies electric power and a clock to the IC card 12 via the contact terminals and the contact pattern.

The second card reader/writer 23 is an interface for performing non-contact communication with the IC card 12. The second card reader/writer 23 includes an antenna (coil) and a modulation/demodulation circuit. The second card reader/writer 23 modulates a signal corresponding to data to be transmitted by the modulation/demodulation circuit and causes the modulated signal to flow to the antenna, thereby causing the antenna to output a radio wave corresponding to the data. The second card reader/writer 23 receives a radio wave from the IC card through the antenna, demodulates the received signal by the modulation/demodulation circuit, and acquires original data. Furthermore, the first card reader/writer 22 supplies electric power to the IC card 12 by the radio wave from the antenna.

The display 24 displays a screen based on data for display (screen data) supplied from the controller 21 or a graphic controller (not shown).

The operation interface 25 is a configuration to generate an operation signal based on an operation. The operation interface 25 receives or generates an operation signal based on an operation of an operation member, such as a mouse, a trackball, a keyboard, a track pad, or a touch sensor, and supplies the operation signal to the controller 21.

In the example of FIG. 1, the host device 11 includes both the first card reader/writer 22 and the second card reader/writer 23, but the host device 11 may include at least one of the first card reader/writer 22 and the second card reader/writer 23. Further, the host device 11 may be configured to include a communication interface to which the first card reader/writer 22 or the second card reader/writer 23 is connected.

Next, a configuration of the IC card 12 will be described.

The IC card 12 is activated by electric power supplied from the host device 11. The IC card 12 receives a command from the host device 11 and executes various processing in accordance with the received command. In addition, the IC card 12 generates a response according to the processing and transmits the response to the host device 11.

The IC card 12 has a card-shaped main body 31 formed of plastic or the like. The IC card 12 includes an IC module 32 in the main body 31. The IC module 32 includes an IC chip 33, a contact communication interface 34, and a non-contact communication interface 35. That is, the IC card 12 is a dual interface card having the contact communication interface 34 for performing contact communication and the non-contact communication interface 35 for performing non-contact communication with the host device 11. The IC chip 33 includes a processor 36, a nonvolatile memory 37, and a RAM 38. The IC card 12 may have an additional element other than those shown in FIG. 1, or a part of the configuration shown in FIG. 1 may be excluded from the IC card 12.

The processor 36 includes an arithmetic element (for example, a CPU) that executes arithmetic processing. The processor 36 executes various operations by executing a program stored in the nonvolatile memory 37.

The nonvolatile memory 37 is a nonvolatile memory that stores a program, data for use in the program, and the like. The program stored in the nonvolatile memory 37 is, for example, an operating system (OS) and an application for performing various processing according to an operation form of the IC card 12. The application is, for example, an IC card application managed by a card issuer (an entity that issued a card). The OS is an IC card control program for causing the processor 36 to realize control and information processing of each unit in the IC card 12. The program and control data in the nonvolatile memory 37 are incorporated in advance in accordance with the specification of the IC card 12 and the like. Note that the IC card 12 may be configured to include a ROM that stores a control program for the IC card, such as an OS and applications.

A file structure defined by ISO/IEC 7816 is configured in the nonvolatile memory 37. For example, a master file (MF), a dedicated file (DF), an elementary file (EF), and the like are stored in the nonvolatile memory 37.

The MF is a file that is the basis of the file structure.

The DF is created at an order below the MF. The DF is a file in which applications and data to be used by the applications are grouped and stored.

The EF is created at an order below the DF. The EF is a file for storing various data. The EF may be placed at an order immediately below the MF.

The RAM 38 is a volatile memory that temporarily stores data. The RAM 38 temporarily stores data that is being processed by the processor 36, programs read from the nonvolatile memory 37, and the like. For example, the RAM 38 functions as a calculation buffer, a reception buffer, and a transmission buffer. The calculation buffer is an area for temporarily holding results of various arithmetic processing executed by the processor 36. The reception buffer is an area for temporarily holding a command (command data) or the like received from the host device 11. The transmission buffer is an area for temporarily holding a response (response data) or the like to be transmitted to the host device 11.

Some of the various functions realized by the processor 36 executing the program may be incorporated into the IC chip 33 as a hardware circuit. In this case, the processor 36 controls the functions performed by the hardware circuit.

The contact communication interface 34 is contact communication means for performing contact communication with the host device 11. For example, the contact communication interface 34 is connected to a terminal of the IC chip 33 and includes a contact pattern exposed on the surface of the IC card 12. The contact pattern is configured to be physically and electrically connected to the contact terminals when the IC card 12 is inserted into the slot of the first card reader/writer 22. The contact communication interface 34 relays electric power supply and data transmission/reception between the host device 11 and the IC chip 33.

The non-contact communication interface 35 is non-contact communication means for performing non-contact communication with the host device 11. For example, the non-contact communication interface 35 includes an antenna (coil), a modulation/demodulation circuit, and a power supply circuit. The non-contact communication interface 35 modulates a signal corresponding to data to be transmitted by the modulation/demodulation circuit and causes the modulated signal to flow to the antenna, thereby causing the antenna to output a radio wave corresponding to the data. Further, the non-contact communication interface 35 receives a radio wave from the second card reader/writer 23 of the host device 11 through the antenna, demodulates the received signal by the modulation/demodulation circuit, and acquires the original data. In addition, the non-contact communication interface 35 rectifies and smooths, via a power supply circuit, an induced current generated in the antenna by a radio wave from the second card reader/writer 23 of the host device 11, and supplies a predetermined power supply voltage to the IC chip 33.

First Embodiment

Next, operations such as activation and initial response of the IC card 12 according to the first embodiment will be described.

Figure 2:
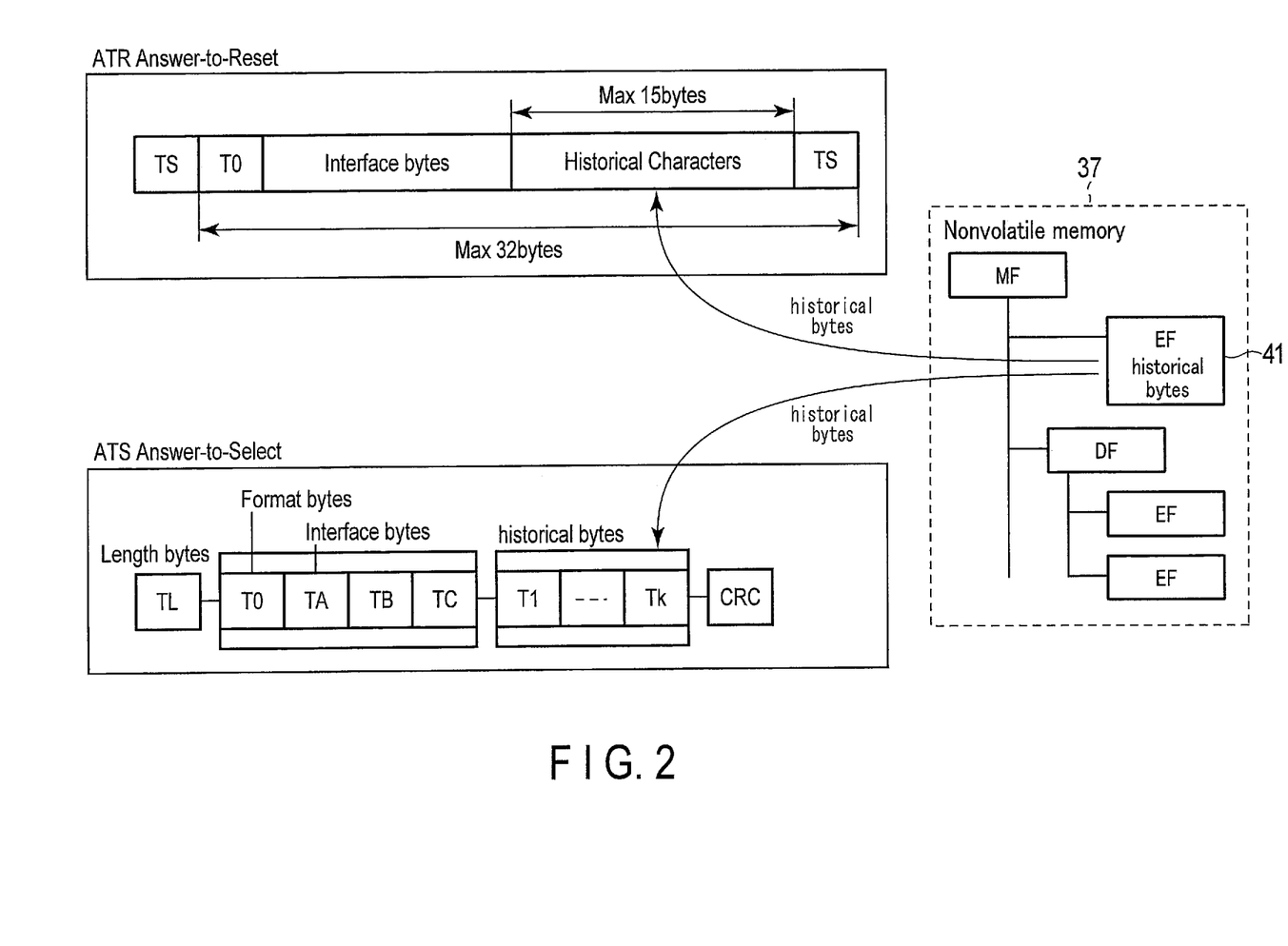
FIG. 2 is an explanatory diagram for explaining an example of an operation of the IC card according to a first embodiment.

FIG. 2 is an explanatory diagram for explaining an initial response from the IC card 12.

The nonvolatile memory 37 of the IC card 12 includes a storage area for storing information (hereinafter referred to as characteristic information) indicating characteristics of the card mainly based on the card operation method of the IC card 12. The characteristic information is configured as historical bytes including, for example, "manufacturer identification information", "IC chip identification information", "number of rewritable times", and "presence or absence of support for an extended format". That is, the nonvolatile memory 37 includes the storage area in which the historical bytes are stored.

In the example of FIG. 2, the historical bytes are stored in advance, for example, in a predetermined EF 41 at an order below the MF. The historical bytes may be stored, for example, in an EF at an order below the DF. The historical bytes may be stored in the nonvolatile memory 37 in a form other than the EF. For example, the historical bytes may be stored in any storage area of the nonvolatile memory 37 in a state in which a tag indicating the historical bytes is added.

When activated, the IC card 12 performs an initial response. In the initial response, the IC card 12 transmits to the host device 11 information for performing setting related to communication between the host device 11 and the IC card 12.

First, the contact communication will be described.

In the contact communication, the IC card 12 is activated by a DC power supply voltage supplied from the host device 11 via the contact communication interface 34. When the IC card 12 is activated, it performs an initial response based on ISO/IEC 7816 regulations. Specifically, the IC card 12 reads necessary information from the nonvolatile memory 37, and transmits to the host device 11 an answer to reset (ATR) whose frame format is defined by, for example, ISO/IEC 7816-3.

As shown in FIG. 2, the ATRs include "TS", "T0", "Interface bytes", "Historical characters", "TSK", and the like. The "Interface bytes" and the "Historical characters" are optional information.

"TS (Initial character TS)" is information indicating a logic level of a signal and a bit transfer order.

"T0 (Format byte T0)" is information indicating the presence or absence of "TA1", "TB1", "TC1", and "TD1" in the first set of "Interface bytes" and the length of "Historical characters".

The "Interface bytes" indicate various parameters on the data transfer protocol.

The "Interface bytes" are information indicating, for example, a data transfer rate.

The "Historical characters" are information (characteristic information) indicating a characteristic of the card mainly based on the card operation method of the IC card 12. For example, the processor 36 of the IC card 12 reads the historical bytes from the EF 41 storing the historical bytes of the nonvolatile memory 37, and sets the historical bytes in the field of "Historical characters". The "Historical characters" are data of 15 bytes at the maximum and are defined by ISO/IEC 7816-4.

"TCK" is information indicating an exclusive OR of each character from "T0" to "TCK". "TCK" is data of 32 bytes at the maximum.

By transmitting the ATR to the host device 11, the IC card 12 becomes able to perform contact communication with the host device 11.

Next, non-contact communication will be described.

In the non-contact communication, the host device 11 periodically performs polling (transmission of an initial response request command) while outputting radio waves for activating the IC card 12 through the antenna of the second card reader/writer 23.

The initial response request command is, for example, Request command type B (REQB) or Request command type A (REQA) defined by ISO/IEC 14443.

The IC card 12 rectifies and smooths an induced current generated in the antenna of the non-contact communication interface 35 by radio waves through the antenna of the second card reader/writer 23, and obtains a DC power supply voltage. The IC card 12 is activated by a DC power supply voltage. When the IC card 12 is activated and receives an initial response request command from the host device 11, the IC card 12 transmits an initial response to the host device 11.

To be more specific, the IC card 12 transmits an Answer To Request command type B (ATQB) or an Answer To Request command type A (ATQA) defined by, for example, ISO/IEC 14443 to the host device 11 as an initial response. The initial response includes a parameter indicating a response (initial response) to the initial response request command, a pseudo-unique IC card (PICC) identifier, application data indicating what application is written, protocol information indicating a supported protocol, a cyclic redundancy check code, and the like.

Upon receipt of the initial response, the host device 11 transmits to the IC card 12 a command for requesting the IC card 12 to provide information (characteristic information) indicating the characteristics of the card. Specifically, the host device 11 transmits a Request for Answer To Select (RATS) for requesting the IC card 12 to transmit an Answer To Select (ATS) to the IC card 12. Frame formats of the ATS and the RATS are defined by ISO/IEC 14443.

When the transmission of the characteristic information is requested, the IC card 12 reads necessary information from the nonvolatile memory 37 and transmits the characteristic information to the host device 11. Specifically, upon receipt of the RATS, the IC card 12 reads the historical bytes from the EF 41 of the nonvolatile memory 37 and transmits to the host device 11 the ATS to which the historical bytes are added.

As illustrated in FIG. 2, the ATS includes "TL", "T0", "TA", "TB", "TC", "historical bytes", "cyclic redundancy check (CRC)", and the like.

"TL" is information indicating the length of the ATS (length byte). The length indicated by "TL" does not include the byte of "CRC".

"T0" is a format byte. "T0" indicates information, such as a presence or absence of subsequent "TA", "TB", "TC", and "historical bytes", and a receivable maximum frame length.

"TA", "TB", and "TC" are interface bytes. "TA" indicates information on a communication speed. "TB" indicates information such as a frame waiting time and a start frame guard time. "TC" indicates whether "Card Identifier (CID)" or "Node Address (NAD)" is supported.

The "historical bytes" are information (characteristic information) indicating a characteristic of the card mainly based on a card operation method of the IC card 12. For example, the processor 36 of the IC card 12 reads the historical bytes from the EF 41 storing the historical bytes in the nonvolatile memory 37, and sets the read historical bytes to the "historical bytes" of the ATS.

"CRC" is a code for use in error detection.

When the IC card 12 is of type A defined by ISO/IEC 14443, the IC card 12 transmits the aforementioned ATS to the host device 11, thereby enabling normal command processing by non-contact communication with the host device 11. In this case, the host device 11 can execute an arbitrary application stored in the DF by transmitting a SELECT command to the IC card 12.

When the IC card 12 is of type B defined by ISO/IEC 14443, the host device 11 transmits ATTRIB to the IC card 12. The IC card 12 adds the ATS or the historical bytes to an Answer To ATTRIB (ATA), which is a response to the ATTRIB to the host device, and transmits the ATA or the historical bytes to the host device 11. Thus, normal command processing by non-contact communication is enabled between the IC card 12 and the host device 11.

As described above, when transmitting the ATR to the host device 11 via the contact communication interface 34, the processor 36 of the IC card 12 reads the historical bytes from the EF 41 storing the historical bytes, adds the historical bytes to the ATR, and transmits the ATR.

When transmitting the ATS to the host device 11 via the non-contact communication interface 35, the processor 36 of the IC card 12 reads the historical bytes from the EF 41 storing the historical bytes, adds the historical bytes to the ATS, and transmits the ATS.

As described above, the processor 36 of the IC card 12 adds the historical bytes in the predetermined storage area (EF 41) of the nonvolatile memory 37 to the ATR in the contact communication and the ATS in the non-contact communication. That is, the processor 36 of the IC card 12 generates the ATR and the ATS using the historical bytes stored in the same storage area in the nonvolatile memory 37 both when transmitting the ATR and when transmitting the ATS.

Next, rewriting of the historical bytes in the first embodiment will be described.

Figure 3:
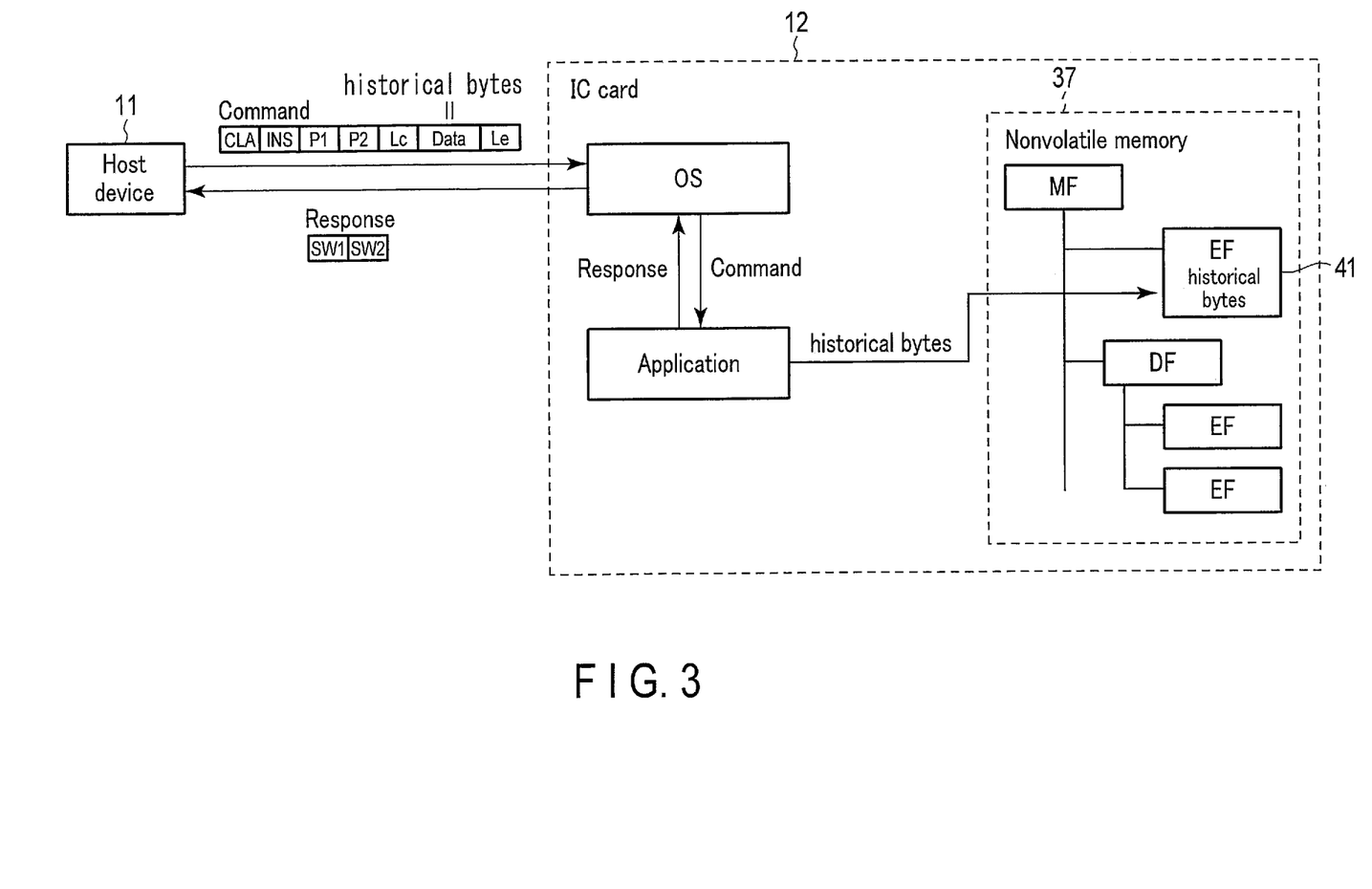
FIG. 3 is an explanatory diagram for explaining an example of an operation of the IC card according to the first embodiment.

FIG. 3 is an explanatory diagram for explaining rewriting of historical bytes stored in the nonvolatile memory 37 of the IC card 12. In FIG. 3, programs (OS, applications, and the like) executed by the processor 36 of the IC card 12 are illustrated in blocks.

The host device 11 transmits a predetermined command, to which historical bytes for rewriting are added, to the IC card 12 through the first card reader/writer 22 or the second card reader/writer 23. Thus, the host device 11 causes the historical bytes of the nonvolatile memory 37 of the IC card 12 to be rewritten. The command to which the historical bytes for rewriting are added may be any arbitrary command.

The format of the command transmitted from the host device 11 to the IC cards 12 is defined by ISO/IEC 7816, and includes fields such as "CLA", "INS", "P1", "P2", "Lc", "Data", and "Le".

"CLA" is information indicating the type of the command. "INS" is information indicating the type of the command. The type of the command is indicated by "CLA" and "INS".

"P1" and "P2" are information indicating parameters corresponding to "INS". "P1" and "P2" indicate, for example, command option designation. For example, "P1" and "P2" indicate IDs of files to be processed.

"Lc" is information indicating the data length (number of bytes) of "Data".

"Data" is information indicating the data body of the command. "Data" stores, for example, data to be used in command processing based on the command.

"Le" is information indicating a data length (maximum length) of a response to the command.

The host device 11 adds historical bytes for rewriting to "Data". That is, the host device 11 transmits to the IC card 12 a command in which historical bytes for rewriting are added to "Data".

The OS of the IC card 12 recognizes the type of the received command by analyzing the values of "CLA" and "INS" of the received command. The OS of the IC card 12 executes processing according to the received command. For example, when receiving a command to which historical bytes for rewriting are added, the OS of the IC card 12 passes the received command to an application managed by the card issuer.

The application of the IC card 12 sets the historical bytes for rewriting that have been added to "Data" of the command in, for example, a buffer area of the RAM 38. Furthermore, the application calculates an offset value of a storage area in the nonvolatile memory 37 in which the historical bytes are stored and a length of the historical bytes in the nonvolatile memory 37. That is, the application calculates an offset value to the head of the EF 41 in which the historical bytes for use in generating the ATR and the ATS are stored, and a length of the historical bytes in the EF 41 (or a length of the EF 41) in the nonvolatile memory 37.

The application of the IC card 12 sets (overwrites) the historical bytes for rewriting that have been added to the command in the nonvolatile memory 37 using an application programming interface (API). The API recognizes the storage area to be overwritten based on the calculation result of the offset value and the calculation result of the length of the historical bytes, and overwrites the recognized storage area with the historical bytes for rewriting that have been added to the command. The application transmits a return value (response) indicating the processing result to the OS in accordance with the processing result. Note that the API may be configured as a part of the application or may be configured as a part of the OS.

The OS confirms the return value from the application and transmits a response to the host device 11 in accordance with the result. The format of the response transmitted from the IC card 12 to the host device 11 is defined by ISO/IEC 7816, and has fields such as "SW1" and "SW2".

"SW1" and "SW2" are information (status bytes) indicating a processing result in the IC card 12. When "SW1" and "SW2" are values indicating a normal end, the host device 11 recognizes that the rewriting of the historical bytes has been normally performed in the IC card 12.

The IC card 12 may be configured such that the OS sets the historical bytes for rewriting that have been added to "Data" of the command in the buffer. Further, the IC card 12 may be configured such that the OS calculates the offset value of the storage area in the nonvolatile memory 37 in which the historical bytes are stored and calculates the length of the historical bytes in the nonvolatile memory 37. In this case, the OS passes to the application the address at which the historical bytes in the buffer are set, the calculation result of the offset value, and the calculation result of the length of the historical byte.

As described above, the storage area in which historical bytes are stored is provided in the nonvolatile memory 37 of the IC card 12. The processor 36 of the IC card 12 sets the ATR and the ATS based on the historical bytes in the nonvolatile memory 37. That is, the processor 36 reads the historical bytes from the storage area in which the historical bytes are stored in the nonvolatile memory 37, and adds the historical bytes to the ATR and the ATS. When the processor 36 of the IC card 12 receives the predetermined command to which the historical bytes for rewriting are added, the processor 36 overwrites the historical bytes for rewriting on the storage area in which the historical bytes are stored in the nonvolatile memory 37.

Thus, the historical bytes added to the ATR in the contact communication and the historical bytes added to the ATS in the non-contact communication are set based on the predetermined command including the historical bytes for rewriting. That is, both the historical bytes added to the ATR and the historical bytes added to the ATS are changed by one command. This eliminates the need to individually change the historical bytes added to the ATR and the historical bytes added to the ATS. As a result, the convenience of the IC card can be improved.

Second Embodiment

Next, operations such as activation and initial response of the IC card 12 according to the second embodiment will be described. In the first embodiment, the historical bytes are described as being read from the storage area in which the historical bytes are stored in the nonvolatile memory 37, and used for both generation of the ATR and generation of the ATS. The second embodiment is different from the first embodiment in that a storage area in which historical bytes for the ATR are stored and a storage area in which historical bytes for the ATS are stored are provided in the nonvolatile memory 37. The same components as those of the first embodiment are denoted by the same reference numerals, and redundant explanations will be omitted.

Figure 4:
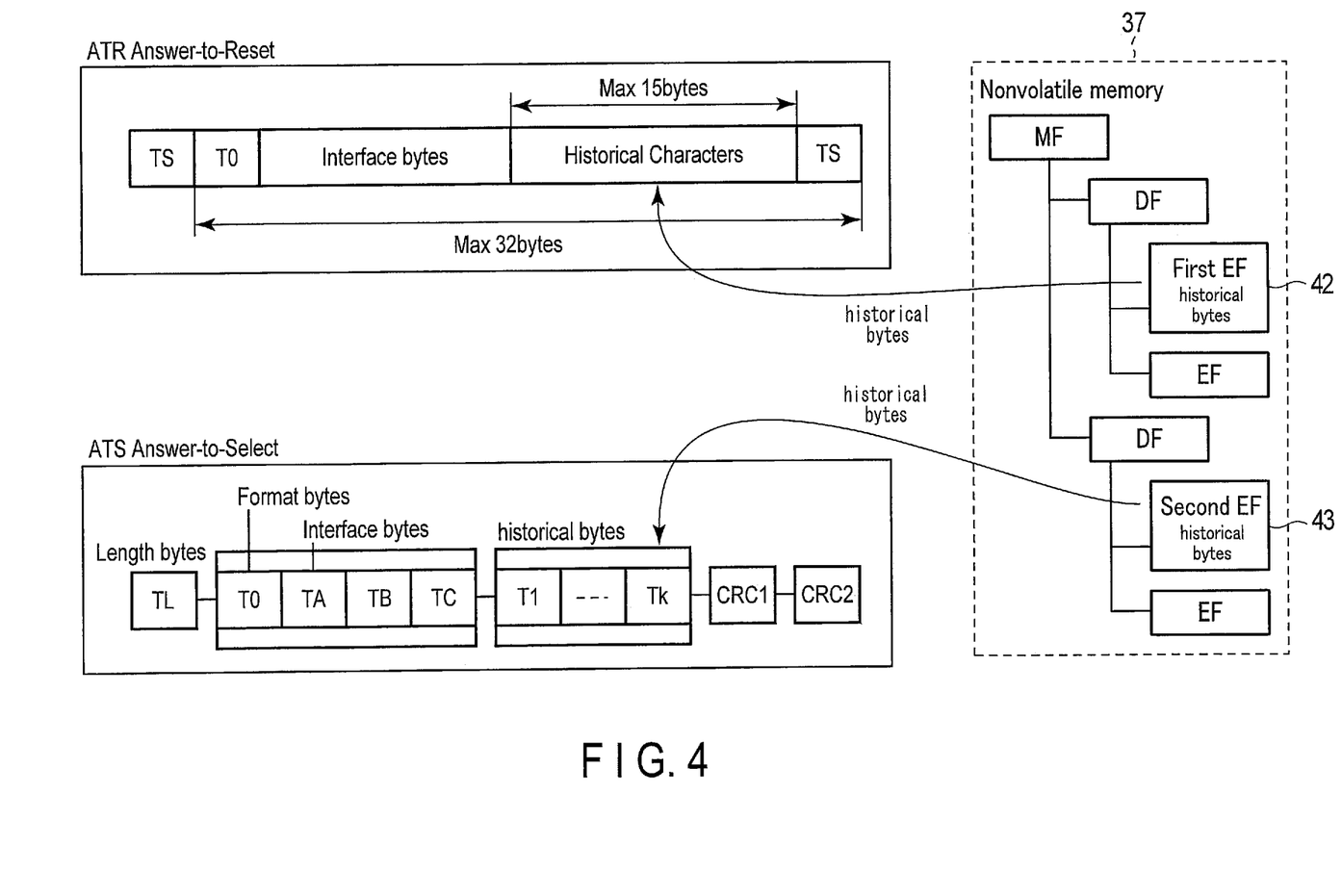
FIG. 4 is an explanatory diagram for explaining an example of an operation of the IC card according to a second embodiment.

FIG. 4 is an explanatory diagram for explaining an initial response from the IC card 12.

As shown in FIG. 4, the nonvolatile memory 37 of the IC card 12 according to the second embodiment is provided with a first EF 42 (first storage area) and a second EF 43 (second storage area). Historical bytes (historical bytes for the ATR) to be used when generating the ATR are stored in, for example, a first EF 42 at an order below a DF. Historical bytes (historical bytes for the ATS) to be used when generating the ATS are stored in, for example, a second EF 43 different from the first EF 42. The historical bytes for the ATR and the historical bytes for the ATS are data having the same contents.

Further, the first EF 42 and the second EF 43 may be provided at an order below the MF. Furthermore, the historical bytes may be stored in the nonvolatile memory 37 in a form other than the EF. For example, the historical bytes may be stored in any storage area of the nonvolatile memory 37 in a state in which a tag indicating that the historical bytes are historical bytes for the ATR or historical bytes for the ATS is added.

First, the contact communication will be described.

For example, in contact communication, when the IC card 12 is activated, it performs an initial response based on ISO/IEC 7816 regulations. Specifically, the IC card 12 reads the historical bytes for the ATR from the first EF 42 of the nonvolatile memory 37, and transmits to the host device 11 the ATR to which the historical bytes for the ATR are added. As a result, the IC card 12 becomes able to perform contact communication with the host device 11.

Next, non-contact communication will be described.

For example, in the non-contact communication, when the IC card 12 is activated, it transmits an initial response to the IC card 12 based on the ISO/IEC 14443 regulations.

Upon receipt of the initial response, the host device 11 transmits a command for requesting feature information to the IC card 12.

Upon receipt of the command for requesting the feature information, the IC card 12 reads the historical bytes for the ATS from the second EF 43 of the nonvolatile memory 37, and transmits to the host device 11 the ATS to which the historical bytes for the ATS are added. Thus, normal command processing by non-contact communication is enabled between the host device 11 and the IC card 12.

The command for requesting the characteristic information is RATS when the IC card 12 is of type A defined by ISO/IEC 14443. In this case, the IC card 12 transmits the ATS to the host device 11 in response to the reception of the RATS.

The command for requesting the characteristic information is ATTRIB when the IC card 12 is of type B defined by ISO/IEC 14443. In this case, the IC card 12 generates an ATA in response to the reception of the ATTRIB, adds the ATS to the ATA, and transmits the ATA to the host device 11.

Next, rewriting of the historical bytes in the second embodiment will be described.

Figure 5:
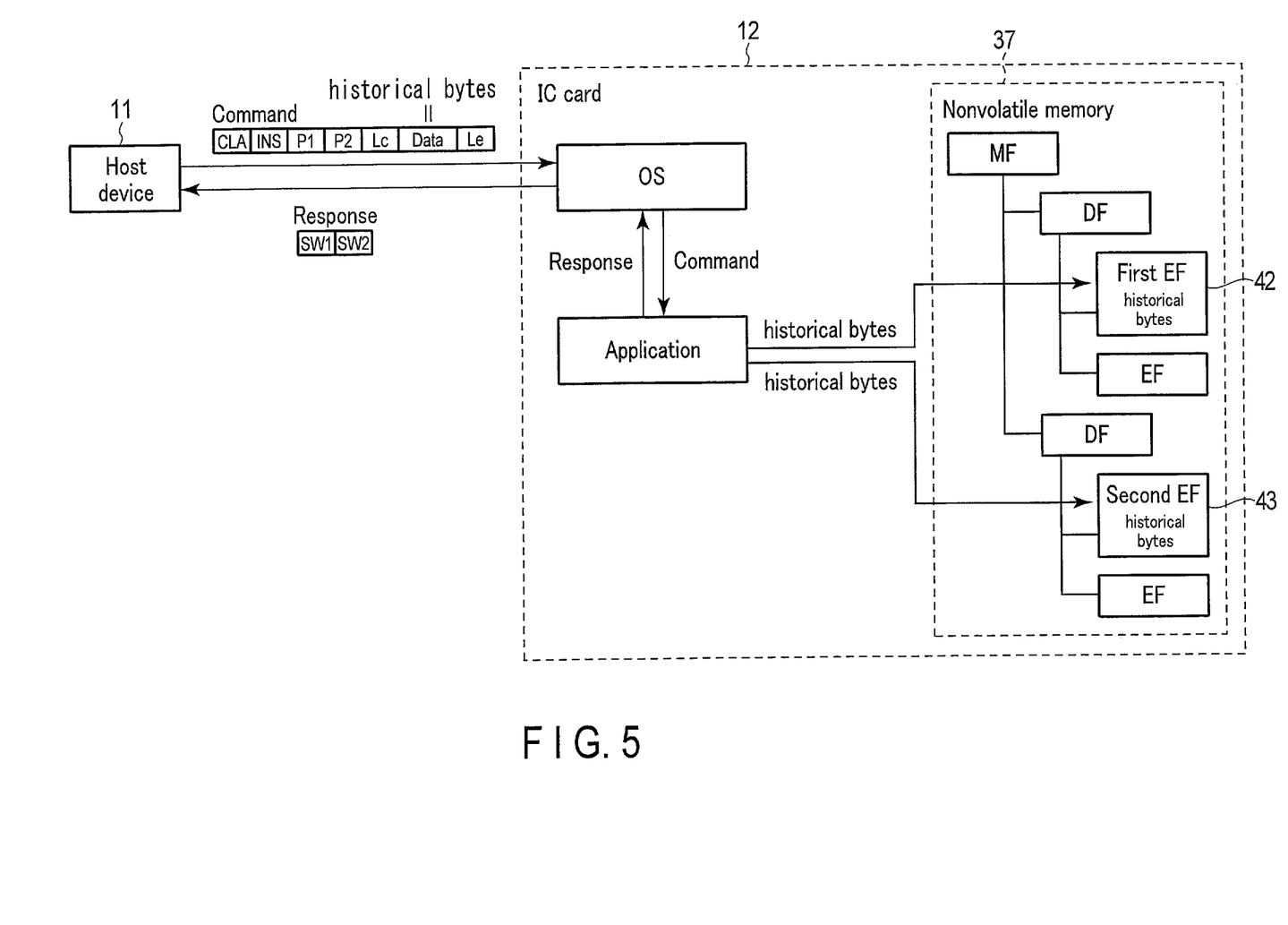
FIG. 5 is an explanatory diagram for explaining an example of an operation of the IC card according to the second embodiment.

FIG. 5 is an explanatory diagram for explaining rewriting of historical bytes stored in the nonvolatile memory 37 of the IC card 12. In FIG. 5, programs (OS, applications, and the like) executed by the processor 36 of the IC card 12 are illustrated in blocks.

The host device 11 transmits a predetermined command, to which historical bytes for rewriting are added, to the IC card 12 through the first card reader/writer 22 or the second card reader/writer 23.

The OS of the IC card 12 recognizes the type of the received command by analyzing the values of "CLA" and "INS" of the received command. The OS of the IC card 12 executes processing according to the received command. For example, when receiving a predetermined command to which historical bytes for rewriting are added, the OS of the IC card 12 passes the received command to an application managed by the card issuer.

The application of the IC card 12 sets the historical bytes for rewriting that have been added to "Data" of the command in, for example, a buffer area of the RAM 38. In addition, the application calculates an offset value of a storage area in the nonvolatile memory 37 in which the historical bytes for the ATR are stored and a length of the historical bytes for the ATR in the nonvolatile memory 37. In addition, the application calculates an offset value of a storage area in the nonvolatile memory 37 in which the historical bytes for the ATS are stored and a length of the historical bytes for the ATS in the nonvolatile memory 37. That is, the application calculates an offset value to the head of each of the first EF 42 and the second EF 43 in which the historical bytes for the ATR and the historical bytes for the ATS are stored, and a length of the historical bytes in the nonvolatile memory 37.

The application of the IC card 12 acquires the historical bytes for rewriting from "Data" of the command, and sets (overwrites) the acquired historical bytes for rewriting to the historical bytes for the ATR of the first EF 42 and the historical bytes for the ATS of the second EF 43. The application transmits a return value (response) indicating the processing result to the OS in accordance with the processing result.

The OS confirms the return value from the application and transmits a response to the host device 11 in accordance with the result.

As described above, in the nonvolatile memory 37 of the IC card 12 according to the second embodiment, the first storage area for storing the historical bytes for the ATR and the second storage area for storing the historical bytes for the ATS are separately provided. The processor 36 of the IC card 12 rewrites both the first storage area and the second storage area based on a predetermined command including historical bytes for rewriting. That is, the processor 36 overwrites both the historical bytes for the ATR in the first storage area and the historical bytes for the ATS in the second storage area with the historical bytes for rewriting included in the predetermined command. The processor 36 adds the historical bytes for the ATR in the first storage area to the ATR in the contact communication. Further, the processor 36 of the IC card 12 adds the historical bytes for the ATS in the second storage area to the ATS in the non-contact communication.

According to the above configuration, the historical bytes added to the ATR in the contact communication and the historical bytes added to the ATS in the non-contact communication are also changed based on the predetermined command including the historical bytes for rewriting. That is, both the historical bytes added to the ATR and the historical bytes added to the ATS are changed by one command. This eliminates the need to individually change the historical bytes added to the ATR and the historical bytes added to the ATS. As a result, the convenience of the IC card can be improved.

The functions described above for each of the embodiments are not only limited to those configured using hardware, and may be implemented using software by causing a computer to read a program in which each function is described. In addition, each function may be configured by appropriately selecting either software or hardware.

While certain embodiments have been described, these embodiments have been presented by way of example only, and are not intended to limit the scope of the invention. The novel embodiments described herein can be implemented in a variety of other forms; furthermore, various omissions, substitutions, and changes can be made without departing from the spirit of the invention. The embodiments and their modifications are covered by the accompanying claims and their equivalents, as would fall within the scope and gist of the inventions.

The invention claimed is:

1. An IC card comprising:
a contact communication interface configured to perform contact communication with a reader/writer;
a non-contact communication interface configured to perform non-contact communication with the reader/writer;
a processor configured to set an Answer To Reset (ATR) in the contact communication and an Answer To Select (ATS) in the non-contact communication based on historical bytes included in a predetermined command; and
a nonvolatile memory including a storage area in which the historical bytes are stored, wherein
the processor is configured to add the historical bytes stored in the storage area of the nonvolatile memory to the ATR and the ATS.

2. The IC card according to claim 1, wherein the processor is configured to rewrite the historical bytes in the storage area of the nonvolatile memory based on the predetermined command including the historical bytes.

3. An IC card comprising:
a contact communication interface configured to perform contact communication with a reader/writer;
a non-contact communication interface configured to perform non-contact communication with the reader/writer;
a processor configured to set an Answer To Reset (ATR) in the contact communication and an Answer To Select (ATS) in the non-contact communication based on historical bytes included in a predetermined command; and
a nonvolatile memory including a first storage area and a second storage area, wherein
the processor is configured to:
overwrite the first storage area and the second storage area with the historical bytes included in the predetermined command;
add the historical bytes in the first storage area to the ATR; and
add the historical bytes in the second storage area to the ATS.

4. A non-transitory computer readable medium including a computer executable control program for an IC card to be executed in an IC card including a contact communication interface configured to perform contact communication with a reader/writer, a non-contact communication interface configured to perform non-contact communication with the reader writer, a processor, and a nonvolatile memory including a storage area in which historical bytes are stored, wherein
the control program causes the processor to set an Answer To Reset (ATR) in the contact communication and an Answer To Select (ATS) in the non-contact communication based on historical bytes included in a predetermined command and store the historical bytes in the storage area of the nonvolatile memory; and
the control program causes the processor to add the historical bytes stored in the storage area of the nonvolatile memory to the ATR and the ATS.

* * * * *